US009565415B2

United States Patent
Zhang et al.

(10) Patent No.: US 9,565,415 B2
(45) Date of Patent: Feb. 7, 2017

(54) METHOD OF PRESENTING THREE-DIMENSIONAL CONTENT WITH DISPARITY ADJUSTMENTS

(75) Inventors: Tao Zhang, Sunnyvale, CA (US); Shan He, Suwanee, GA (US); Dekun Zou, Princeton Junction, NJ (US)

(73) Assignee: THOMSON LICENSING, Issy les Moulineaux (FR)

( * ) Notice: Subject to any disclaimer, the term of this patent is extended or adjusted under 35 U.S.C. 154(b) by 40 days.

(21) Appl. No.: 13/821,099

(22) PCT Filed: Sep. 13, 2011

(86) PCT No.: PCT/US2011/051326
§ 371 (c)(1),
(2), (4) Date: Mar. 6, 2013

(87) PCT Pub. No.: WO2012/037075
PCT Pub. Date: Mar. 22, 2012

(65) Prior Publication Data
US 2013/0162641 A1    Jun. 27, 2013

Related U.S. Application Data

(60) Provisional application No. 61/403,325, filed on Sep. 14, 2010.

(51) Int. Cl.
*G06T 19/20* (2011.01)
*H04N 13/00* (2006.01)

(52) U.S. Cl.
CPC ........... *H04N 13/0018* (2013.01); *G06T 19/20* (2013.01); *H04N 13/0022* (2013.01); *H04N 2013/0081* (2013.01)

(58) Field of Classification Search
CPC ............ H04N 13/0003; H04N 13/0022; H04N 13/0018; H04N 2013/0081; G06T 19/20
See application file for complete search history.

(56) References Cited

U.S. PATENT DOCUMENTS 5,726,704 A    3/1998   Uomori
6,163,337 A    12/2000  Azuma et al.
(Continued)

FOREIGN PATENT DOCUMENTS

JP    1040420      2/1998
JP    2002123842   4/2002
WO    WO2009020277 2/2009

OTHER PUBLICATIONS

Goshtasby, "2D and 3D Image Registration for Medical, Remote Sensing, and Industrial Applications". Wiley-Interscience 2005; Table of Content, p. 43, p. 60-61, p. 63, p. 103-105.
(Continued)

*Primary Examiner* — Xiao Wu
*Assistant Examiner* — Chong Wu
(74) *Attorney, Agent, or Firm* — Brian J. Dorini; Lily Neff

(57) ABSTRACT

Visual discomfort from depth jumps in 3D video content is reduced or avoided by detecting the occurrence of a depth jump and by changing the disparity of a group of received image frames including the frames at the depth jump in order to adjust the perceived depth in a smooth transition across the group of image frames from a first disparity value to a second disparity value. Depth jumps may be detected, for instance, when content is switched from one 3D shot to another 3D shot.

16 Claims, 6 Drawing Sheets

(56) References Cited

U.S. PATENT DOCUMENTS

| | | |
|---|---|---|
| 2002/0061131 A1 | 5/2002 | Sawhney et al. |
| 2008/0112616 A1 * | 5/2008 | Koo et al. |
| 2009/0096863 A1 * | 4/2009 | Kim et al. .................... 348/42 |
| 2009/0244268 A1 * | 10/2009 | Masuda et al. ................ 348/51 |
| 2011/0149050 A1 * | 6/2011 | Imada ............... H04N 13/0011 348/51 |
| 2011/0310982 A1 * | 12/2011 | Yang et al. ............. 375/240.26 |

OTHER PUBLICATIONS

Tekalp, "Digital Video Processing", Prentice-Hall 1995; p. 72-93.
Tomasi et al., "Shape and Motion from Image Stream: a Factorization Method—Part 3: Detection and Tracking of Point Features", Technical Report CMU-CS-91-132, Apr. 1991; Abstract, p. 1-20.
Mendiburu, "3D Movie Making: Stereoscopic Digital Cinema from Script to Screen", Focal Press, Elsevier 2009; Table of Content, p. 82 and p. 87-88.
Search Report Dated Nov. 21, 2011.
Konrad, Janusz, "Enhancement of viewer comfort in stereoscopic viewing: parallax adjustment," Electronic Imaging 99. lnternational Society for Optics and Photonics, 1999.
Elagatsyjam et al, "Extraction and viewing parameter control of objects in a 3D TV System," The Journal of the Institute of Television Engineers of Japan, vol. 63(9), pp. 1265-1271, Sep. 1, 2009.

\* cited by examiner

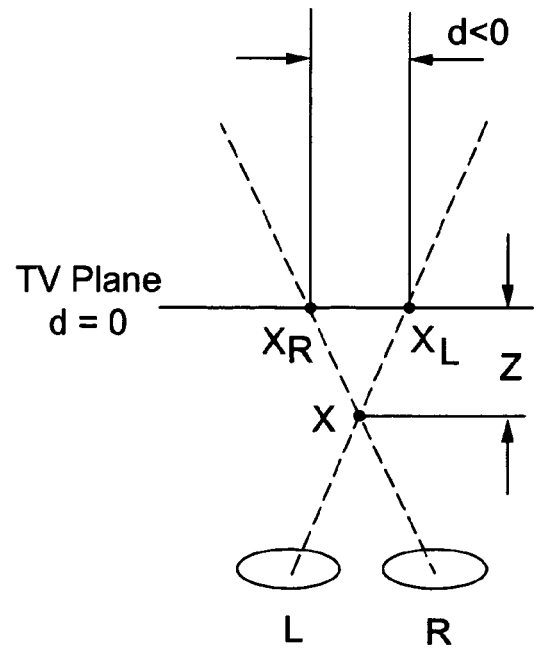
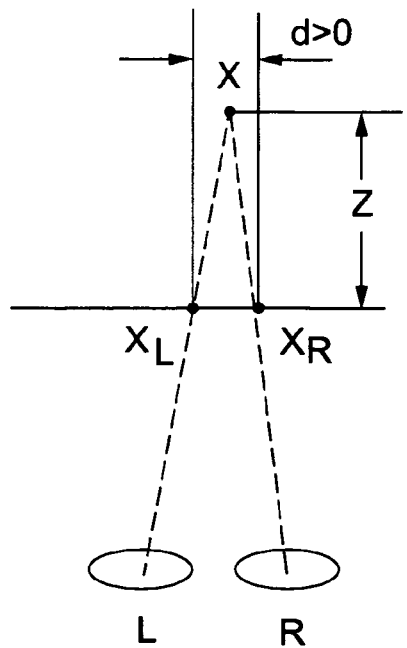
FIG. 2A  FIG. 2B
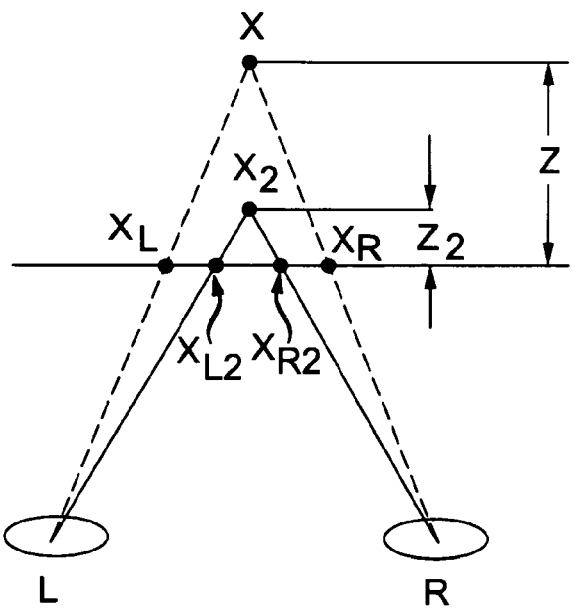
FIG. 6

METHOD OF PRESENTING THREE-DIMENSIONAL CONTENT WITH DISPARITY ADJUSTMENTS

CROSS-REFERENCE TO RELATED APPLICATIONS

This application claims the benefit, under 35 U.S.C. §365 of International Application PCT/US2011/051326, filed Sep. 13, 2011, which was published in accordance with PCT Article 21(2) on Mar. 22, 2012 in English and which claims the benefit of U.S. provisional patent application No. 61/403,325, filed Sep. 14, 2010.

TECHNICAL FIELD

The present invention relates to three-dimensional (3D) image presentation and, more particularly, to reducing viewing discomfort associated with significant depth jumps.

BACKGROUND OF THE INVENTION

Television programming is becoming more widely available in 3D. Sporting events and concerts have been broadcast for home consumption. As 3D component sales ramp up and as the demand for 3D grows, it is expected that 3D programming will be offered widely on most of the popular TV channels in the near future.

Viewers currently switch channels quite frequently among various programming content. Since this content is all typically two-dimensional (2D), there is usually no viewing difficulty or discomfort as content is switched by a viewer or for a viewer by the service provider. As the amount of viewable 3D programming content becomes more widely available in the future, the viewer is likely to encounter viewing problems when switching between channels, especially when one or more of these channels involves 3D programming content.

One problem in viewing 3D content occurs when adjacent image frame pairs have significant difference in depth. This is more commonly known as a "depth jump" because the depth at the regions of interest is perceived to change significantly between these two image frame pairs. When a viewer is channel surfing (i.e., changing channels in relatively quick succession), depth jumps may occur in many different situations. Depth for 3D content on one channel may be different from the depth of the 3D content on a newly tuned channel. When advertising content is inserted into the 3D programming content, the advertising content may exhibit a different depth, or even a different dimensionality from the 3D programming content. Dimensionality can change from 3D to 2D when the scene depth changes to zero. Within the same 3D programming content, depth jumps tend to occur concurrent with a shot or scene change. When depth jumps occur, viewers can experience varying degrees of discomfort.

Depth jumps within programming content such as a 3D movie are generally avoided or mitigated in the production phase or post-production phases. Unfortunately, when these problems are caused either by the viewer, when changing programs, or by the service providers, when inserting additional 2D or 3D content (e.g., advertisements), depth jumps cannot be avoided because they occur in real time and in an unplanned manner.

When time and circumstances permit, it is obvious that an opportune stage in which to avoid or even remove a depth jump is the production stage. In the production stage, there is full control over the content without any real-time constraints. During 3D content production, it is somewhat easier to remove the depth jump since the producer has full control over the presentation of the content. For example, when 3D content is being generated by computer graphics, the frames may be edited and rendered until there are no apparent depth jumps in the scene sequence.

Even when dealing with live shot films, the appearance of a depth jump between shots can be ameliorated by using well known techniques such as a cross-fade effect or an active depth cut. But these techniques have limited use for the real time scenarios confronting the 3D TV viewer. For example, although the cross-fade effect has been extensively used in producing audio effects and is easily implemented for video, its use would be inappropriate for all instances of shot switching, especially when a clear picture quality rather than a faded one is required during the transition period between shots.

In generating active depth cuts, outgoing and incoming shots are re-converged toward each other over some specified number of frames. Active depth cuts require implementation of a manual image shifting technique in the post-production stage. It is time consuming and it increases cost.

In the 3D TV environment, the luxury of production and post-production operations is not afforded due to the real-time nature of the depth jumps, either the ones that are viewer initiated via channel surfing or those that are initiated by the service provider via advertising insertion and the like. Depth jumps should be corrected in real time at the broadcast end or at the viewer end, such as in either a set top box (STB) or the TV itself, in order to reduce the potential for viewer discomfort.

For 3D TV broadcasting, it has been explained above that commercials are often inserted into a TV broadcast program as the program content is being broadcast. It does not appear to be practical to adjust the depth at the service provider location (e.g., such as a cable or satellite service provider or distributor) using active depth cut or cross-fade methods every time a commercial is inserted into programming content. Different commercials may be inserted into the same programming content for broadcast to different geographic audience.

None of the techniques discussed above or known in the art are suitable for dealing with these depth jumps to avoid wholly, or lessen partially, any possible viewer discomfort. Hence, an automatic method to adjust the depth of 3D content in real time, such as during the actual broadcast of the 3D content, appears to be needed in order to enhance the viewing experience of the 3D content.

SUMMARY OF THE INVENTION

Visual discomfort from depth jumps in a received 3D video content is reduced or avoided in accordance with the principles of the present invention by automatically detecting the occurrence of a depth jump and by changing the disparity of a group of received image frames including the frames at the depth jump in order to adjust the perceived depth in a smooth transition across the group of image frames from a first disparity value to a second disparity value.

One aspect of the present invention provides a method for presenting stereoscopic content comprising a plurality of sequential stereoscopic image pairs, each image pair including a first view and a second view. The method involves: detecting an occurrence of a depth jump between a first and a second image pairs of the plurality of image pairs, the first and second image pairs being consecutive pairs characterized respectively by a first disparity and a second disparity with the first image pair preceding the second image pair; and changing respective disparities for at least the first and second image pairs, a third image pair preceding the first image pair, and a fourth image pair after the second image pair for use in presenting the stereoscopic content. After changing the respective disparities, any two consecutive image pairs appearing between the third and fourth image pairs has a disparity difference that is less than a difference between the first disparity and the second disparity.

Another aspect of the present invention provides a system for presenting stereoscopic content comprising a plurality of sequential stereoscopic image pairs, each image pair including a first view and a second view. The system includes at least one processor for detecting an occurrence of a depth jump between a first and a second image pairs of the plurality of image pairs, the first and second image pairs being consecutive pairs characterized respectively by a first disparity and a second disparity with the first image pair preceding the second image pair, and for changing respective disparities for at least the first and second image pairs, a third image pair preceding the first image pair, and a fourth image pair after the second image pair for use in presenting the stereoscopic content. After changing the respective disparities, any two consecutive image pairs appearing between the third and fourth image pairs has a disparity difference that is less than a difference between the first disparity and the second disparity. The system also includes a display for displaying at least one stereoscopic image pair output from the at least one processor.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIGS. 2A-B illustrate the relationship between screen parallax and perceived depth;

FIG. 6 illustrates adjustment of depth by change of parallax value based on the principles illustrated in FIGS. 2A-B.

Figure 1:
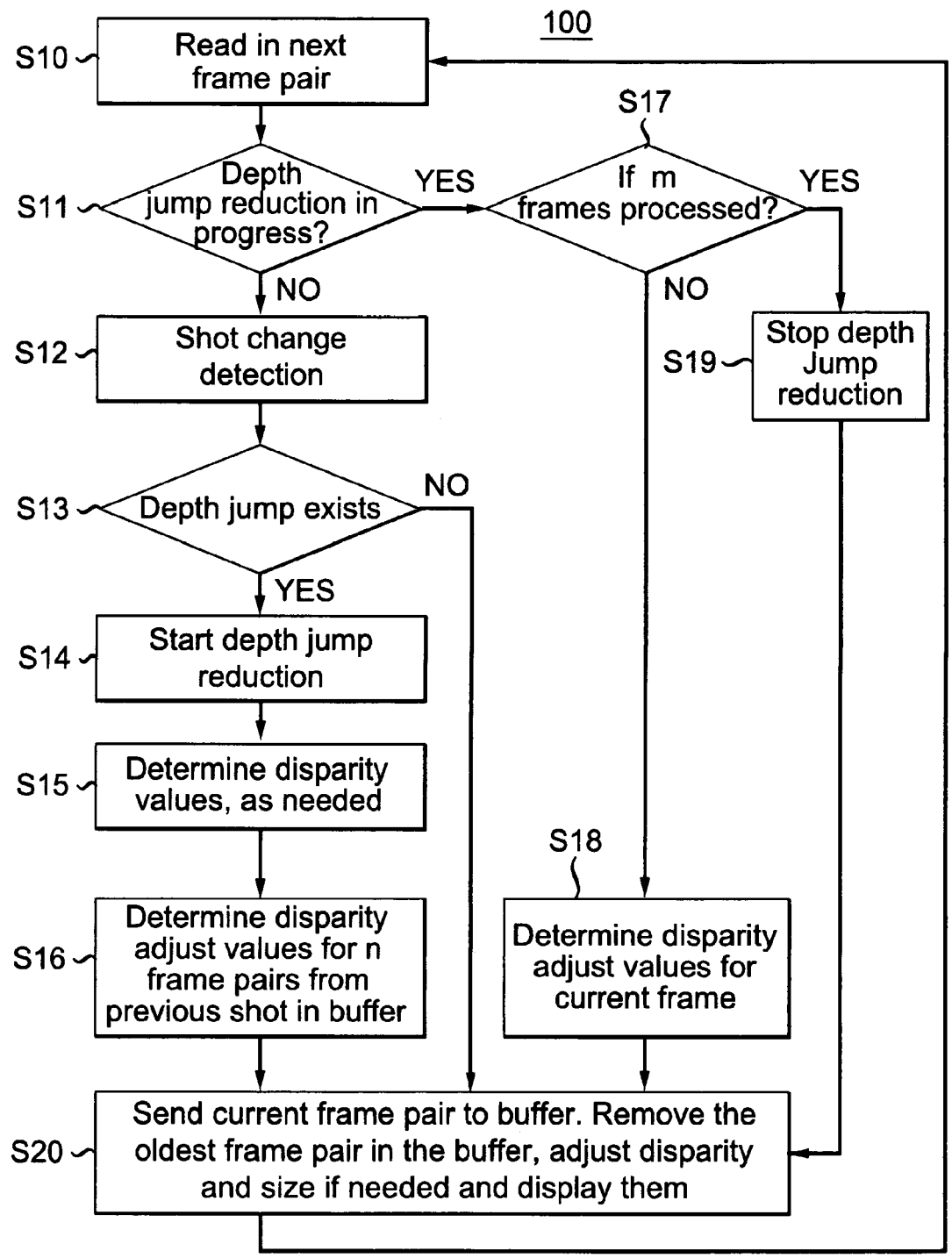
FIG. 1 illustrates a depth jump reduction process in accordance with the principles of the present invention.

The exemplary embodiments set out herein illustrate preferred embodiments of the invention, and such exemplary embodiments are not to be construed as limiting the scope of the invention in any manner.

DETAILED DESCRIPTION

A simple and effective automatic method is presented for reducing viewing discomfort, which may be perceived by a 3D TV user, when content is switched from one 3D shot or scene to another 3D shot or scene. Such switching may occur during channel surfing by the viewer or during commercial advertising breaks inserted between content segments.

Details of one or more implementations are set forth in the accompanying drawings and the description below. Even if described in one particular manner, it should be clear that implementations may be configured or embodied in various manners. For example, an implementation may be performed as a method, or embodied as an apparatus configured to perform a set of operations, or embodied as an apparatus storing instructions for performing a set of operations. Other aspects and features will become apparent from the following detailed description considered in conjunction with the accompanying drawings and the claims.

The present method is based on the fact that image shifting, e.g., changing the relative horizontal positions of left and right eye images of a stereoscopic image pairs, can change the convergence point of the images seen by a viewer and thereby can improve visual comfort in viewing properly shifted content. In the following description, it is assumed that depth jumps typically occur when changing shots during, for example, channel changes or when switching from program content to advertising content. In addition to these applications, the principles of the present invention may also be applied to other scenarios such as within a shot where depth change is significant, for example.

The present inventive techniques with image shifting for depth jump adjustment in 3D content may be employed for online and offline operation. The term "off-line" is intended to encompass operations that are performed at a time outside of a real-time viewing event, such as a post-production operation. The term "on-line" is intended to encompass real-time viewing events on a TV or content player, for example, when the content is being shown to a viewer.

Online operation is better adapted for the 3D TV environment in which the program switching, such as insertion of a commercial by a service provider or a channel switch by the viewer, is unpredictable and the real-time or near real-time operation is desired. Offline operation is intended for a less restrictive environment in which resources are more widely available and in which response time is not placed at as much of a premium. The description below may tend to focus primarily on the online approach for the method. Although the online and offline approaches are substantially similar, offline adaptations of the method that may be different from the online techniques are presented, when necessary.

In accordance with the principles of the present invention, a method for adjusting the depth of content by image shifting in response to a depth jump is shown in FIG. 1. Method 100 includes the operations of: receiving pairs of stereoscopic 3D images; detecting a depth jump, e.g., via the occurrence of a shot change; determining a disparity range for each image pair in a defined window of frames including the depth jump; image shifting to adjust depth for an image pair; and, if necessary, scaling the images for size adjustment. When the images have been processed by this method, they are presented for display at an adjusted depth more properly suited to comfortable viewing through and subsequent to the frames including the detected depth jump.

In step S10, a frame comprising a pair of stereoscopic 3D images, e.g., a left-eye view image (L) and a right-eye view image (R), is received or read by a processor. The 3D content is provided as a stream or sequence of image pairs, that is, a frame sequence, and each image pair (i.e., left and right images) in a frame is processed according to method 100.

Decision step S11 determines whether a depth jump adjustment—more often realized as a depth jump reduction because a depth jump increase would tend to increase viewer discomfort—is in progress. If the determination is that a depth jump adjustment is in progress, method 100 proceeds to step S17. Otherwise, the method proceeds to step S12.

In step S12, a shot or scene change detection is performed. The shot or scene change detection techniques are well known in the art and will not be described here in detail. Shot changes can occur between program content and an inserted advertisement, or between program content from a prior TV channel and a newly changed channel, or even within the same program content when scenes or camera angles are changed. While detection of a shot or scene change is not completely determinative of a depth jump, it is a sufficiently reliable indicator that a depth jump might have occurred.

If a shot change is not detected in step S12, it will be determined in step S13 that a depth jump has not occurred, and no computation of disparity is needed. If a shot change is detected in S12, then step S13 will determine whether a depth jump exists based on a criterion of the disparity values of at least the current frame and the frame immediately before the current frame, e.g., whether these two adjacent frames have a disparity difference exceeding a certain threshold value.

Thus, disparity or horizontal positional differences are determined in this step for some or all features in the current frame and at least the prior received frame. Feature detection and feature correspondence techniques or the like can be used. When the features have been properly detected and matched in a corresponding image frame pair, their disparities or horizontal positional differences can be measured and stored. A disparity range can then be determined for each frame together with any other statistical information about the disparities, such as mean disparity, median disparity, and so on.

In one embodiment, a depth jump is deemed to exist if the difference in the median disparities of the two adjacent frames is at least equal to or larger than a predetermined threshold value. As an example, the threshold value can be selected to be about 40 pixels, i.e., a depth jump is absent for any two adjacent frames having a difference of mean disparity below 40 pixels.

In another embodiment, the disparity values of the current and a number of previous frames (i.e., not only the immediate prior frame) resident in the frame buffer can be determined for use in assessing whether a depth jump exists or not.

If a depth jump is found in step S13, the depth jump adjustment processing is initiated in step S14. Specifically, image shifting of the stereoscopic images is used to adjust the disparity value of each stereoscopic image pairs over a number of frames, so that depth jump between adjacent frames can be reduced. Frame window selection (i.e., selection of a certain number of frames for depth jump adjustments) can be performed in this step. Since all the frames preceding and following a depth jump are available in an offline adaptation of this process, it has been found that a window of n+m+1 frames is preferred for depth jump adjustment. The window includes: n frames preceding the depth jump occurring as a result of the current frame $f_0$; the current frame $f_0$ at which depth jump is detected, and m frames immediately following the current frame. A similar approach can be used for the online adaptation, but it may be limited by the size of the frame buffer that holds the current frame $f_0$ and the non-zero number of prior received frames.

If, in step S13, the disparity values are determined only for two frames $f_0$ and $f_{-1}$, then disparity values for other previous frames, i.e., $f_{-2}$ through $f_{-n}$, (with n being a positive integer), and various disparity-related parameters such as the range, mean, median and so on, can be determined in step S15, as necessary.

In step S16, disparity adjustment values are computed for the buffered frames in the shot prior to the depth change, i.e., frames $f_{-1}$ through $f_{-n}$, for example, based on the disparity values, disparity range and/or other suitable statistical information (such as median disparity).

In step S20, the current frame $f_0$ is placed in the frame buffer and the oldest frame in the buffer, frame $f_{-n}$, is removed. When step S20 is entered from S16, the frames $f_{-1}$ through $f_{-n}$ are disparity adjusted for the depth jump by image shifting techniques. If necessary, the images are scaled to adjust their image size. For example, the size of an image can be adjusted in accordance with its disparity adjustment, such that, if the image has been adjusted to be closer to the viewer, its size can be adjusted to be correspondingly larger. The current frame $f_0$ can also be similarly adjusted at this point. Ultimately the images are sent to a display for rendering and presentation to the viewer. When step S20 is entered from step S13, no adjustments are made to the images for disparity or size. Method 100 proceeds to step S10 to iterate the process on the next received image pair.

In step S11, when a "YES" response denotes that the depth jump adjustment process is already in progress, method 100 proceeds to step S17. At step S17, it is determined whether m frames have been processed, i.e., if the first frame outside (or after) the frame adjustment window (frame $f_{m+1}$) has been received in step S10. If the frame $f_{m+1}$ has been received for processing, then no further depth jump adjustment is necessary in step S19 since all frames in the adjustment window have been processed, and no disparity or size adjustment is needed in step S20.

However, if it is determined in step S17 that the current frame is still within the frame adjustment window, i.e., from frame $f_1$ to frame $f_m$, then further depth jump adjustment will be necessary and the method proceeds to step S18.

In step S18, a disparity adjustment value is computed for the current frame, that is, one of frames $f_1$ through $f_m$ received after the detection of depth jump at frame $f_0$, and the method proceeds to step S20.

Exemplary techniques employed in the steps of method 100 are described below in more detail.

Shot change detection is used at least in step S12 as a basis in step S13 to determine whether potential depth jumps occur. As described herein, exemplary locations for the occurrences of depth jumps are shot changes including program content changes and the insertion point of commercials into an existing program. Other locations indicative of potential depth jumps may be recognized by persons skilled in this art area.

For the online adaptation of the inventive technique, shot change detection should be performed automatically in equipment such as in a TV or on a STB. Detection of shot changes or commercial insertions in TV programs can be accomplished using many techniques well known in the art. Exemplary shot change detection techniques are disclosed in U.S. Pat. Nos. 6,597,405 and 6,870,956, the teachings of which are expressly incorporated herein by reference. These shot change detection techniques generally provide an indication of whether a new shot exists and where the starting frame pair of the detected shot change is, if any.

If the offline adaptation of the technique is employed, this step may be performed by personnel in the post-production stage or pre-broadcasting stage. The latter may be preferred when dealing with inserted advertisements in TV program content.

In the above description, depth jumps are assumed to occur during shot or scene change. However, a depth jump can also occur within the same shot. For this latter circumstance, methods similar to those used for shot change detection, as described above, are well known in the art and can be used to determine occurrence of the depth jump within the same shot.

Frame window selection used in step S14 is now described in more detail below. In an exemplary embodiment of this invention, it is preferred that a depth transition be smooth between shots. Further, it is preferred that the transition also is more gradual rather than less gradual (i.e., a more rapid change over time). As such, selection of a sufficiently sized window of frames, i.e., a sufficient number of frames covering a certain time duration, before and after the shot change is required in order to accomplish the desired transition. It is assumed that the selected frames in the frame window are identified as frames $f_{-n}, \ldots, f_{-1}, f_0, f_1, \ldots, f_m$. Frames associated with a previous shot are frames $f_{-n}$ to $f_{-1}$. These frames are generally stored in a frame buffer since they precede the current frame. Frames associated with the current shot are frames $f_0$ to $f_m$. The shot change obviously occurs from frame $f_{-1}$ to frame $f_0$. Frame $f_0$ is the first frame in the current shot determined in the shot change determination portion of the inventive process. The selected range of frames can thus be denoted as [−n, m] with respect to $f_0$, where n>0 and m>0. In offline processing, all contents can be easily accessed from a storage medium, so that the integers defining the frame window may be selected as n>1 and m>1. Exemplary values may be n=10 and m=10. In general, a larger window (i.e., larger number of frames) should be used for larger depth jumps, and the value of n may be limited by the buffer size.

For an online real-time adaptation of this method, unpredictability of the timing of a shot switch presents a degree of difficulty for the process. It is possible that fewer than n frames from the previous shot will be available in the frame buffer of the processing unit such as a TV or STB. If a frame buffer of size n is used for storing frames before processing and presentation for display, it is possible to achieve the same frame window size as used for offline processing. Thus, it is possible to achieve the same type of depth change transition effect as the one achieved for offline processing. At a minimum, at least one frame from the previous shot should be maintained in the frame buffer for processing. This means that the integers defining the frame window may be selected as n>0 and m>0. Frames from the current shot (i.e., the frames coming after $f_0$) are processed one by one as they are individually received.

It is understood that the frames herein are actually comprised of image frame pairs. For example, current frame $f_0$ includes both left view and right view frames (also referred to as image pairs).

When the frame window size has been determined in step S14, it is then possible to compute the respective disparity (depth) adjustments in step S16 for the frames within the frame window. While it is possible to perform dense depth computation for the frames of image pairs, such a computation is difficult and time consuming. Computation of a dense depth map is simply not a satisfactory alternative for the real-time processing needed for handling real-time depth jumps in a TV or an STB. A somewhat quicker, less complex, and thus a more cost effective option for handling real-time depth jumps involves this use of screen parallax or equivalently, disparity. Screen parallax is shown in FIG. 2 as the horizontal positional difference between corresponding views (left and right) of a feature or an object in the views. Screen parallax serves as a measure of perceived depth. In the literature, parallax and disparity are usually used interchangeably. In the context of this invention, the disparity for an object in the 3D video refers to the horizontal separation, in number of pixels, between the left- and right-eye images. An object having zero disparity (i.e., the right view coinciding with the left view) will appear at the display screen. An object with a positive disparity (i.e., right-eye image appearing to the right of the left-eye image) will appear behind the screen, and a negative disparity (i.e., right-eye image appearing to the left of the left-eye image) will appear in front of the screen. Parallax refers to the actual distance between the left- and right-eye images when displayed. Therefore, the parallax value of an object depends on both the disparity of the object and the display size. For a fixed display size, the parallax is equivalent to the disparity.

FIG. 2 shows the relationship between screen parallax (denoted by "d") and perceived depth (denoted by "Z"). In this figure, $X_L$ is the projected image of a point in left view L of an image pair, $X_R$ is the projected image of the corresponding point in the right view R of the image pair, and X is position of the perceived image as seen by the viewer.

In FIG. 2A, the image X is shown at a perceived depth Z consistent with negative parallax, and in FIG. 2B, the image X is shown at a perceived depth Z consistent with positive parallax. The screen parallax d (same as disparity in this case of a fixed display size) is defined as:

$$d = \text{horizontal position of } X_R - \text{horizontal position of } X_L.$$

In this equation, it is assumed that the two cameras producing the left and right views, L and R, are arranged in a side-by-side configuration with some amount of horizontal separation there between. This side-by side configuration is also intended to cover the situation where the cameras exhibit a vertical separation due to their vertical arrangement with one camera over the other. When cameras are arranged in a vertical or top-bottom configuration, then the equation would be correspondingly changed so that the screen parallax would be defined as:

$$d = \text{vertical position of } X_R - \text{vertical position of } X_L$$

It will be understood that, when parallax is positive (d>0), the perceived image is located behind the screen (i.e., behind the TV plane); when there is no parallax (d=0), the perceived image is located on the screen; and when parallax is negative (d<0), the perceived image is located in front of the screen.

From experimental practice, it appears reasonable to conclude that screen parallax d is related to perceived depth. Perceived depth is the depth a viewer perceives when viewing the 3D content as shown in FIG. 2, and is related to, but different from, real depth (which is the actual distance of an object from the cameras capturing the image of that object). Perceived depth generally has a substantially similar depth rank ordering to such an ordering for real depth. But it should be appreciated that the amount in depth is subject to change as a result of projective transformation of the cameras, for example. In order to understand this point, it is assumed that if points A, B, and C in one frame exhibit rank ordering for real depths as follows, realDepth(A)>realDepth(B)>realDepth(C), then it is expected that the rank ordering of perceived depths will be as follows, perceivedDepth(A)>perceivedDepth(B)>perceivedDepth(C).

The actual distance between these points will not be maintained generally in the transition from real depth to perceived depth. It should also be understood that these relationships are intended to be maintained within the same frame, but will not necessarily remain the same for the same points A, B, and C across different frames.

The exact relation between screen parallax and real depth is complex and not easily determined. When the left and right views are captured by devices whose viewing axes are parallel, the relationship between screen parallax and real depth is found to be substantially linear. Otherwise, when the left and right views are captured by devices whose viewing axes are not parallel such as when they are in a toed-in relationship, the relationship between screen parallax and real depth is found to be substantially nonlinear. From experimental practice herein, it is found that the relationship between screen parallax and perceived depth is always linear regardless of the orientation of the left and right capturing devices. Based on this experimental practice, it has been found that the larger the absolute value or magnitude of the screen parallax (and thus the disparity), the larger the absolute value of perceived depth (the farther away from the screen).

Perceived depth is the depth experienced by the viewer. Real depth is not actually experienced by the viewer. Based upon this realization, it has been determined herein that it is possible and even preferable to use screen parallax or equivalently, disparity, and therefore perceived depth, as an effective way to determine depth values for images in 3D context.

Disparity can be computed as positional differences in pixels for corresponding features found in 3D stereoscopic image pairs. General computation of positional difference for a selected feature is shown in relation to FIGS. 2A-B above. In order to obtain the positional differences, features must be detected, correspondence established between the left and right images, and selected from points, lines, or regions in the individual images of a stereoscopic pair. Feature detection and correspondence is believed to be well known in the technical art area. A number of patent and non-patent references describing feature detection and feature correspondence determination are identified below.

Figure 3:
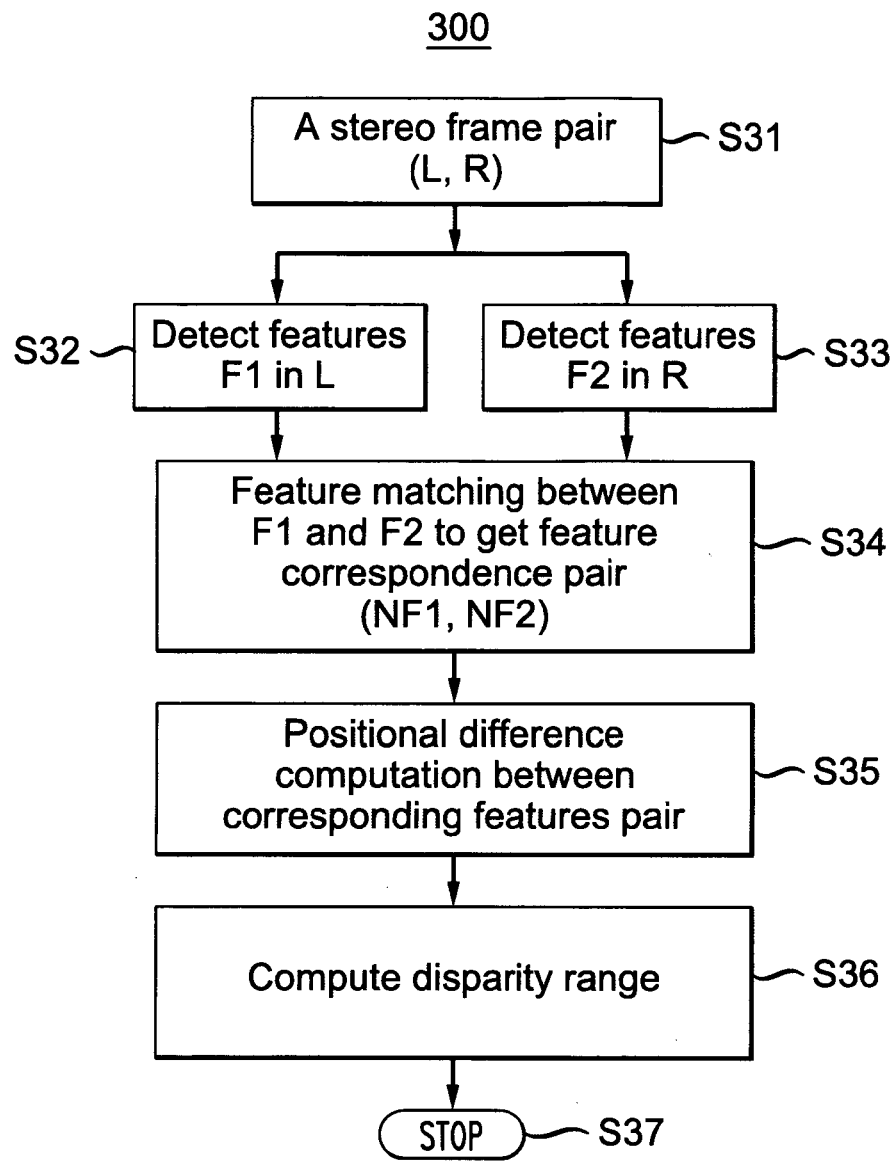
FIG. 3 illustrates a process for computing a disparity range for a stereoscopic frame pair based on feature detection and feature correspondence and employed in the process of FIG. 1.

FIG. 3 shows an exemplary disparity computation technique for use in determining the disparity range (e.g., in step S13 and/or S15) of (L, R) pairs of corresponding left and right-eye images, each of which comprises a frame in a stereoscopic 3D frame sequence of images.

The technique shown is FIG. 3 has been explained in detail in PCT published application WO 2011/071467 A1, "Method for Distinguishing a 3D Image from a 2D Image and for Identifying the Presence of a 3D Image Format by Feature Correspondence Determination", the teachings of which are expressly incorporated herein in their entirety.

Step S31 receives the stereo pair of images (L,R). Typically, the stereo pair includes a left view and a right view, as described above. At the completion of step S31, method 300 proceeds to steps S32 and S33.

Steps S32 and S33 perform feature detection in the separate views of the image pair (L, R). The features detected from image L in step S32 are identified as: $F1=\{F1_i|i=1 \ldots q_1\}$, and the resulting features detected from image R in step S33 are identified as: $F2=\{F2_i|i=1 \ldots q_2\}$, where $q_1$ and $q_2$ are the number of features found in each respective image. After steps S32 and S33, the method proceeds to step S34.

While feature detection may be performed over an entire image, it is also contemplated that one or more selected portions of an image may be used for feature detection. The use of less than the whole image area can result in reduced computational complexity and increased speed of operation. In one example, the central portion or region of an image is selected as the region in which features are detected.

Feature correspondence based methods detect features and establish a one-by-one correspondence between detected features. It is also contemplated that feature tracking may be used instead of feature detection and feature correspondence in the steps above and below. In an example from experimental practice, the KLT feature tracking method has been used in the execution of steps S32 and S33. These feature detection and tracking techniques are well known in the art and are fully described in references cited below.

In step S34, feature correspondences (matching) are found between the resulting features F1 in view L from step S32 and F2 in view R from step S33. The feature correspondence or matching process in this step generally removes those features in one image that do not have corresponding features in the other image. When the features are removed from each feature set F1 and F2, the new or remaining feature points in L are identified as: $NF1=\{NF1_i|i=1 \ldots Q\}$, and new or remaining feature points in R are identified as: $NF2=\{NF2_i|i=1 \ldots Q\}$, where Q is the total number of features having correspondences and where $Q \leq \min(q_1, q_2)$. A pair designated as $(NF1_i, NF2_i)$ identifies a pair of matching feature points found in both the L view and the R view. Feature correspondence and matching is believed to be well known in the art and will not be described in detail herein. Several references, incorporated herein by reference and listed herein below, disclose a number of the correspondence and selection techniques applied to image features. At the completion of this step, the method proceeds to step S35.

As mentioned above, it is contemplated that feature correspondence can be performed using feature tracking. In the present method, feature detection and feature correspondence computation have been used to find matching features as shown in steps S32, S33, and S34. However, feature matching or correspondence can be implemented as feature tracking instead, as shown below. First, features in L are computed. Then, features computed in L are used as initial feature positions in R to track features in R. Finally, the features in R that are tracked are then determined to correspond to the features in L. Features lost in tracking in R are to be removed.

Although the KLT tracking method was employed in the experimental practice of the inventive method, the method herein does not adopt a specific feature matching or correspondence algorithm as a preferred technique since many feature matching algorithms are contemplated for use by this inventive method. Several feature tracking methods such as the KLT tracking method are taught by Bruce D. Lucas and Takeo Kanade: "An Iterative Image Registration Technique with an Application to Stereo Vision", presented at the International Joint Conference on Artificial Intelligence at pages 674-679 in 1981; and by Carlo Tomasi and Takeo Kanade: "Detection and Tracking of Point Features" in Carnegie Mellon University Technical Report CMU-CS-91-

132 published in April 1991. A point feature detection method known as the SIFT method is disclosed by David Lowe: "Object recognition from local scale-invariant features" published in the Proceedings of the International Conference on Computer Vision in 1999 at pages 1150-1157. Several feature detection and matching methods useful in performing feature correspondence are described by A. Ardeshir Goshtasby: "2-D and 3-D image registration: for medical, remote sensing and industrial applications", published by Wiley-Interscience in 2005, e.g., Chapter 3 for feature selection at pages 42-63, and Chapter 4 for feature correspondence at pages 63-106. The teachings of these four references are expressly incorporated herein by reference in their entirety.

In step S35, the position difference is computed between corresponding feature pairs ($NF1_i$, $NF2_i$) for each pair i identified in the (L, R) views. In this computation, the position of a feature point $NF1_i$ is defined as $(x_{1i}, y_{1i})$ and the position of a corresponding feature point $NF2_i$ is defined as $(x_{2i}, y_{2i})$. The disparity set DX is defined is as follows:

$$DX = \{DX_i = x_{1i} - x_{2i} | i = 1, \ldots, Q\},$$

where Q is the total number of features in the image pair. DX contains a complete range of disparities or positional differences for the current frame being processed. In this example, the positions are chosen to be relative to a common point in both images. In one example for experimental practice, the common point in both images could be selected as a left-top corner viewed as the origin. It will be understood by persons skilled in the art that absolute positions can be used rather than relative positions, and that other locations in an image can be used as a common reference point or origin. When this computation is completed for all the features in the image pair or the selected region of the image pair frame, method 100 proceeds to step S36.

At step S36, the disparity set DX is analyzed to produce a disparity range for the frame including the minimum disparity value and maximum disparity value for the given region in stereoscopic pair of corresponding images. Since the complete set of positional differences is included in the set DX, other statistics such as mean value, median value, and the like can be computed in step S36 for later use.

When a frame $f_i$ has been processed in step S36, the associated disparity range is shown as $P(f_i) = [L_i, U_i]$, where $L_i$ and $U_i$ are the respective lower and upper bounds for the disparity range in the selected region(s) of frame pair i. As described above, computation of disparity range for each frame pair may be applied to each image in its entirety or to one or more selected portions of the entire image.

After the disparity values and range have been determined and frame window has been selected (in steps S13-S14, and optionally S15), image shifting can be performed over the selected frames based on the disparity adjust values from step S16, to reduce the depth jump between the frames in successive shots. The shift is actually a change in the horizontal positional differences between the images in a pair. This concept is reviewed again in FIG. 6, which shows the relationship between positional difference and perceived depth.

In FIG. 6, perceived depth is adjusted by changing disparity/parallax values. The change in disparity/parallax values results from a shift in the horizontal position of each image view. In FIG. 6, $X_L$ is the feature point seen by the left eye, $X_R$ is the corresponding point seen by the right eye, Z is the perceived depth for 3D feature X. The depth is adjusted by disparity/parallax (horizontal position difference) shifting each of the views. A shift in the horizontal directions causes the feature point viewed by the left eye to move from $X_L$ to $X_{L2}$, whereas the corresponding feature point viewed by the right eye is moved from $X_R$ to $X_{R2}$. This image shifting cause perceived depth to become $Z_2$. In concept, the size of the depth jump is directly proportional to the size of the disparity/parallax change in the depth jump.

When there is large depth jump (large disparity difference), a reference disparity value "a" can be selected to be close to the disparity values for both the previous and current shots so that viewing is comfortable. It is generally assumed that both shots producing the depth jump have been processed to have disparity within a comfortable range so that a reference value "a" in between these disparity values will also be comfortable to view.

In accordance with the present invention, the n frames $f_{-n}$ to $f_{-1}$ of the previous shot at the depth jump are then shifted so that they are smoothly transitioned in disparity from their original disparity in frame $f_{-n}$ toward the reference disparity, and the m+1 frames $f_0$ to $f_m$ of the current shot at the depth jump are shifted so that they are smoothly transitioned in disparity from their reference disparity "a" in frame $f_0$ to their original disparity in frame $f_m$. This procedure is depicted in different exemplary fashions for similar shots in FIGS. 4A-B and 5A-B.

Figure 4A:
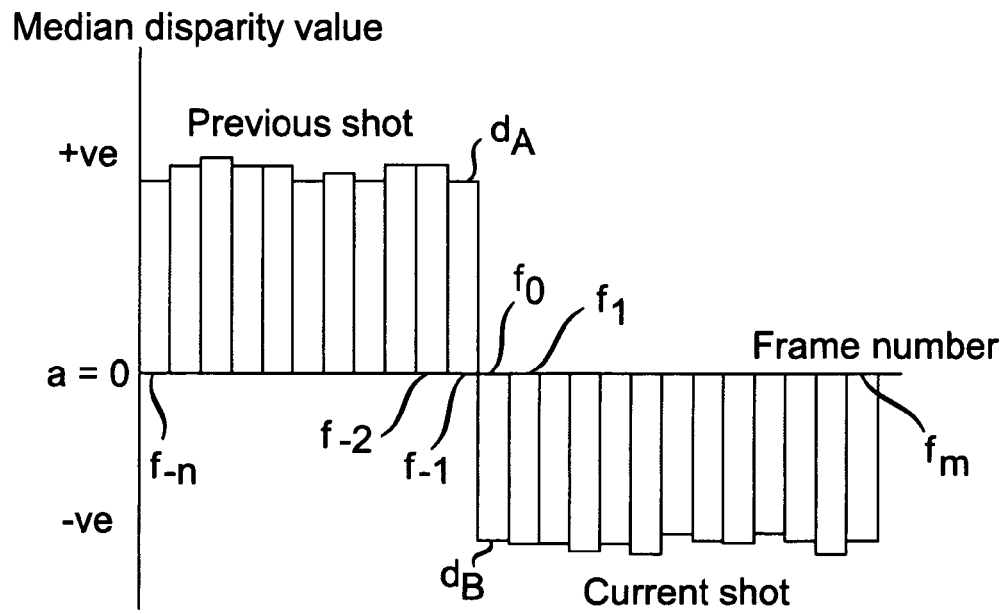
FIGS. 4A-B and 5A-B depict alternative techniques for image shifting to achieve a depth jump reduction over a sequence of stereoscopic frame pairs in accordance with the principles of the present invention.
Figure 4B:
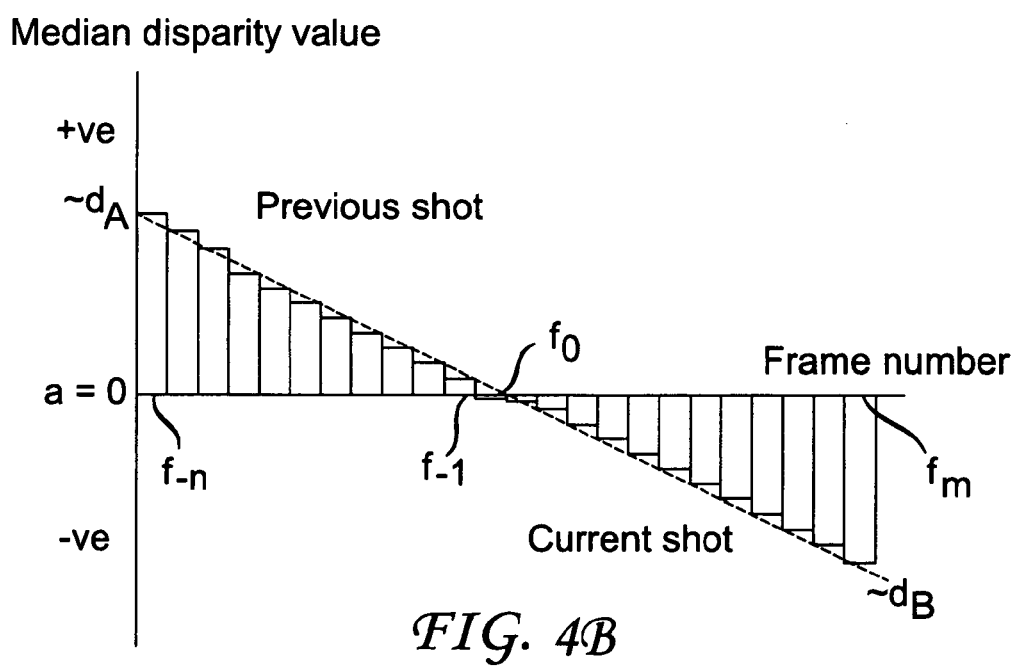

FIGS. 4A-B show one example of depth jump reduction by image shifting. The median disparity value is plotted along the y-axis as a function of frames along the x-axis, and each bar in FIGS. 4A-B represents the median disparity value for a particular frame (based on the features points used for disparity range calculation), with the frames of a previous shot positioned to the left of the frames of the current shot. The reference disparity value is shown as a=0. In the example of FIG. 4A, a depth jump occurs between frame $f_{-1}$ of the previous shot and frame $f_0$ of the current shot. To avoid viewing discomfort associated with the depth jump from median disparity $d_A$ to $d_B$ ($d_B$ being a negative disparity) image shifting is performed in accordance with the principles of the present invention, resulting in the adjusted disparities of FIG. 4B. The median disparity value for each frame is affected or changed so that the desired smooth transition in depth adjustment is realized throughout the frames of the previous and current shots. In FIG. 4B, the disparity decreases monotonically from about $d_A$ to $d_B$ over many frames, instead of changing abruptly over two frames as in FIG. 4A.

Figure 5A:
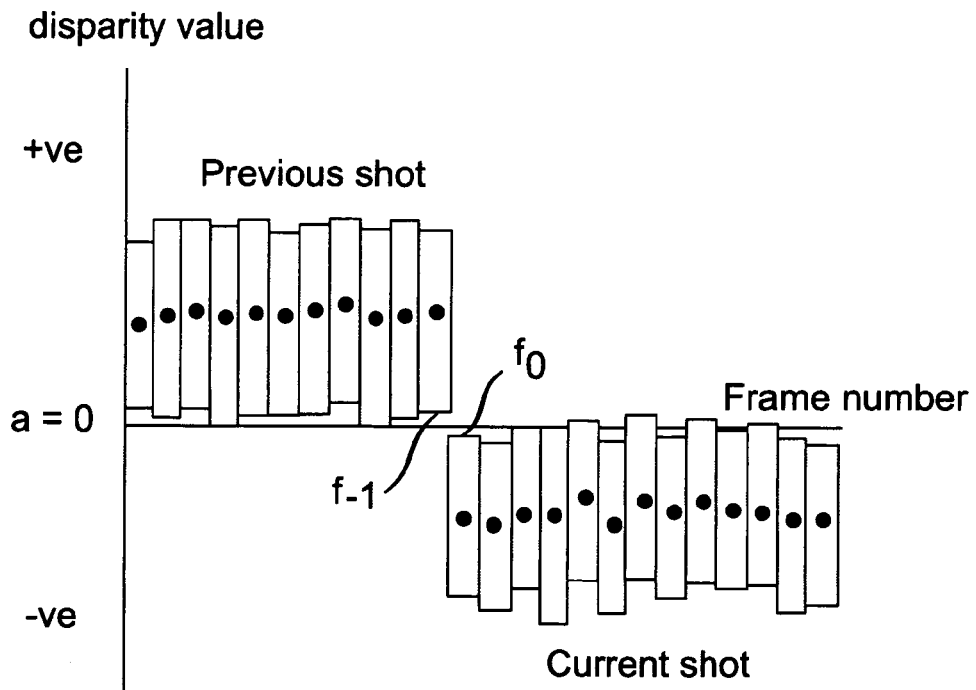
Figure 5B:
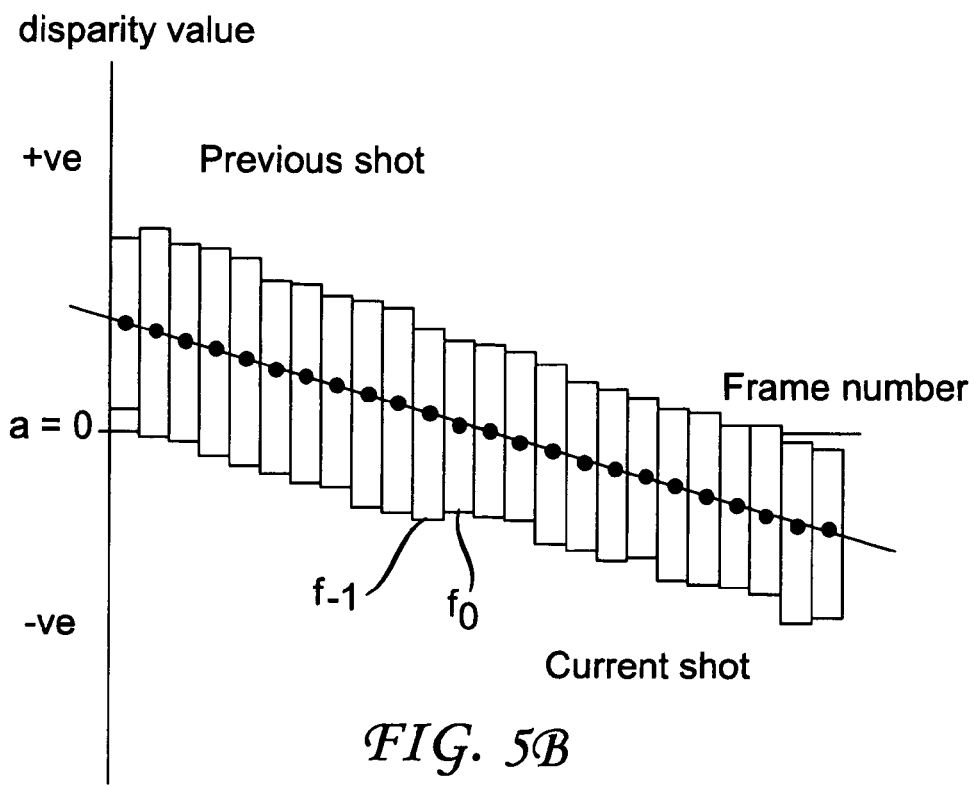

FIGS. 5A-B show another example of depth jump reduction by image shifting. Each bar in the figure represents the disparity range value for a frame, and the median value of each frame's disparity range is indicated by a black dot. The reference value is again selected to be a=0, with a depth jump between frames $f_{-1}$ and $f_0$ in FIG. 5A. When image shifting is performed in accordance with the principles of the present invention, the disparity range for each frame is shifted smoothly and gradually throughout the frames of the previous and current shots as shown in FIG. 5B.

When the reference value is selected as a=0 (indicative of zero disparity or 2D), the viewed object is actually shown with no perceived depth. The object appears to be at the level of the screen, which is a comfortable viewing position for all viewers.

One exemplary implementation of the image shifting technique for depth jump reduction is described below in which a disparity interval ("P_interval") is defined as a targeted amount of disparity difference (after disparity adjustment) between consecutive frames for the selected frame window, when a depth jump has been detected between the current and previous frames or shots. The exemplary reference value "a" is also selected as a value from the disparity range $P(f_i)$ defined in terms of lower and upper disparity bounds $L_i$ and $U_i$, respectively. Since excessive popup effects may cause discomfort for more viewers, it may be advisable to select a value between a median and lower bound of the disparity range. Clearly, many other possibilities exist as choices for these values since the discomfort is a more subjective feeling for each viewer. In the following example, the median value is selected for comparison with the reference value "a".

To begin the adjustment process for the frames of the previous shot, which have been identified as totaling n frames in the frame buffer, P_interval is defined as:

$$P\_interval = (median(P(f_{-n})) - a)/n$$

Image shifting is then realized is follows for each frame of the previous shot:

$$median(P(g_{-n})) = median(P(f_{-n}))$$

$$median(P(g_{-(n-1)})) = median(P(f_{-(n)})) - P\_interval$$

...

$$median(P(g_{-(n-i)})) = median(P(f_{-(n)})) - i * P\_interval$$

...

$$median(P(g_0)) = a,$$

where $g_i$ represents the shifted version of the frame $f_i$. As the image shifting process continues through the m+1 frames of the current shot, it is assumed that the disparity (depth) change within the m remaining frames is relatively small The current frame $f_0$ is then used as a reference for the disparity ranges of remaining m frames with a new P_interval being defined for the current shot as:

$$P\_interval2 = (median(P(f_0)) - a/m.$$

Image shifting is then realized as follows for each incoming (or subsequent) frame of the current shot:

$$median(P(g_1)) = a + P\_interval2$$

...

$$median(P(g_i)) = a + i * P\_interval2$$

...

$$median(P(g_m)) = medium(P(f_0)).$$

In above example, linear transitions have been used in realizing the image shift through the frames involved in the depth jump. It is contemplated that other linear and nonlinear transitions may be employed. Step-wise or piecewise increments (decrements) may also be used. In general, a monotonic increasing or decreasing gradual transition from one frame to the next is aesthetically and visually more pleasing and less discomforting than a jumpy and more rapid transition. However, it is also possible to provide the same disparity values for certain adjacent frames, i.e., neither increasing nor decreasing from one frame to the next. Many of these considerations are governed by the processing power and buffer memory size of the system performing the depth adjustment.

Image shifting is performed on the input left and/or right video frame (image). Image shifting is performed in a horizontal direction by a number of pixels determined in relation to the disparity shift being applied to the frame. Typically, the overall disparity shift for a frame is equally divided for each of the image views so that half of the overall frame shift is applied to each image view, but the application in each is oppositely directed to the other view. In this way, the overall image shift results in the correct amount of adjusted disparity and depth in the projected 3D stereoscopic frame image.

As described above, image shifting is used to re-converge the stereoscopic 3D image pair to reduce possible visual discomfort during a depth jump. After image shifting, some parts of the contents can be lost. Techniques for handling the stereoscopic images under these circumstances are described in a related, commonly owned PCT patent application PCT/US11/041574 filed on Jun. 23, 2011 and claiming the benefit of priority from U.S. provisional patent application 61/359,342, entitled "Method and Apparatus For Customizing 3-Dimensional Effects of Stereo Content" filed on Jun. 28, 2010. The teachings of both cited patent applications are expressly incorporated herein by reference.

As taught in the above two applications, one or more of the following actions can be taken to resolve image loss problems occurring as a result of image shifting:
1) lost image content can be padded with black pixels in the event that the shifted video frame no longer overlaps a part of the actual input video frame for the particular view;
2) the input video frame for each view can be proportionally scaled to a larger size (resolution) in order to insure that the shifted video frame will almost always cover image content from the input video frame for each view;
3) in place of the prior action, larger original content may be used directly from the original content provider.

It may also be desirable to scale the image shifted content after the depth jump adjustment so that proportionality of objects in the parallax or disparity shifted frames is somewhat restored to account for the adjustment in depth. This technique is described in detail in the two patent applications mentioned above (PCT/US11/041574 and U.S. 61/359,342).

Figure 7:
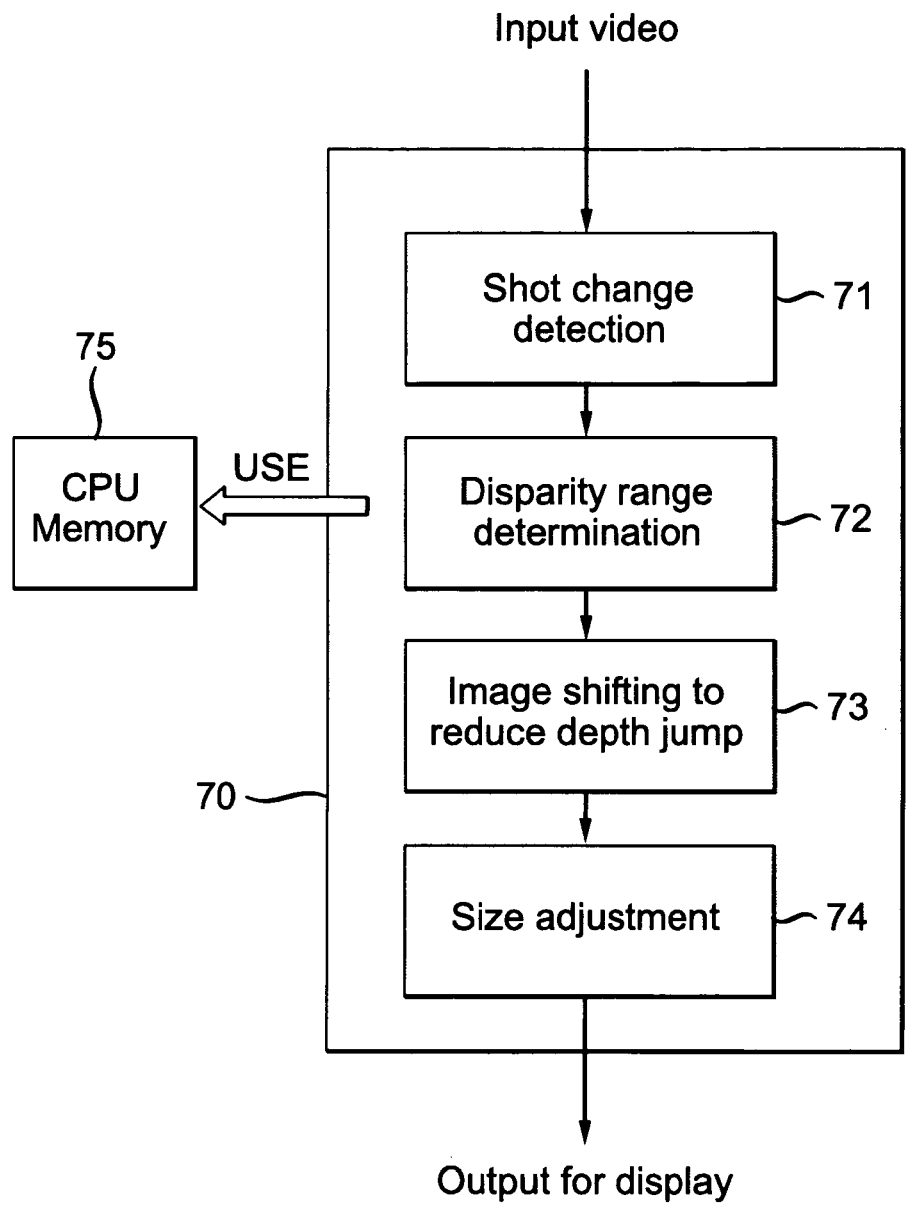
FIG. 7 illustrates a system for realizing a depth jump reduction over a sequence of stereoscopic frame pairs.

FIG. 7 illustrates a system based on the principles of the present invention. A general or specialized processor 70 is shown coupled to a memory 75. The memory can serve, in part, as a frame buffer for the received video frames. Processor 70 receives the input sequence of video frames and outputs a similar stream of video frames for display. Processor 70 may be realized in a stand-alone configuration or as part of a larger system such as a TV or an STB at a viewer's location.

Processor 70 is configured to have a number of different modules or units to perform various operations in the inventive depth jump adjustment by image shifting described herein. Module 71 performs shot change detection as shown in FIG. 1. Disparity range determination, described in reference to FIGS. 1 and 3, is performed in module 72. Image shifting for depth jump reduction as shown in reference to FIGS. 1-2 and FIGS. 4-6 is executed by module 73. Size adjustment via scaling of the image shifted video content can be performed, if desired, in module 74 prior to outputting the processed video frame sequence for display on the viewer's TV or other displays, including a variety of portable devices (not shown). Such a system can be used for implementing one or more embodiments of content presentation described above, in which disparities for a number of image frames are adjusted such that viewer discomfort arising from depth jumps can be avoided or reduced.

Referring back to FIGS. 4A-B, since each frame includes an image pair of a left eye view and a right eye view, a method of content presentation can also be described as operating on the image pairs, as opposed to each frame. One embodiment can generally include the steps of: detecting a depth jump between a first and second image pairs that appear consecutively in time (e.g., first image pair in frame $f_{-1}$ and second image pair in frame $f_0$ in FIG. 4A), changing respective disparities for at least these two image pairs and at least two additional image pairs, e.g., a third image pair in a frame preceding or appearing before frame $f_{-1}$ and a fourth image pair in a frame appearing after frame $f_0$. The frames for the third and fourth image pairs can be any frames within a window selected for disparity adjustments, e.g., any frame between $f_{-n}$ and $f_{-2}$ and any frame between $f_1$ and $f_m$ in FIG. 4A, and do not have to be immediately before $f_{-1}$ or immediately after $f_0$.

The respective disparities of at least these frames are adjusted so that, after adjustments, any consecutive image pairs within the frame window will have disparity difference (or depth jump) that is less than the original disparity difference between the first and second image pairs. In other words, any consecutive image pairs (or frames) in FIG. 4B will have a disparity difference that is less than the difference between frame $f_{-1}$ and $f_0$ shown in FIG. 4A, i.e., less than $|d_A - d_B|$. Under certain situations, depending on the magnitude of the depth jump and performance criterion, it may be possible to adjust the disparities over only two frames, i.e., $f_0$ and $f_{-1}$, to achieve the desired reduction in depth jump between these two frames.

Although the scenarios herein primarily involve shot changes and depth jumps between 3D contents, the inventive techniques may be directly applied to the scenarios involving shot switching between 2D and 3D contents.

The above descriptions and illustrations of presenting 3D content with disparity adjustments are exemplary of various embodiments of the present invention. All statements herein reciting principles, aspects, and embodiments of the present invention, as well as specific examples thereof, are intended to encompass both structural and functional equivalents thereof. Such equivalents include both currently known equivalents as well as equivalents developed in the future, including any elements developed at any that perform the same function, regardless of structure.

Various modifications can also be made, e.g., elements of different implementations may be combined, supplemented, modified, substituted or removed to produce other implementations that can perform at least substantially the same function(s), in at least substantially the same way(s), to achieve substantially the same result(s) as the implementations disclosed. As such, the appropriate scope of the invention is to be determined according to the claims, which follow.

The invention claimed is:

1. A method for presenting stereoscopic content comprising a plurality of sequential stereoscopic image pairs, each image pair including a first view and a second view, the method comprising:
    detecting when there is a channel or scene change;
    detecting via occurrence of said channel or scene change an occurrence of a depth jump between a first and a second image pairs of the plurality of image pairs, the first and second image pairs being consecutive pairs characterized respectively by a first disparity and a second disparity with the first image pair preceding the second image pair; and
    determining a disparity range for each image pairs in a defined window of frames including any depth jump;
    changing respective disparities for at least the first and second image pairs when there is an increase or decrease between depth changes, a third image pair preceding the first image pair, and a fourth image pair after the second image pair for use in presenting the stereoscopic content; after changing the respective disparities, any two consecutive image pairs appearing between the third and fourth image pairs has a disparity difference that is less than a difference between the first disparity and the second disparity; wherein the changing is performed incrementally and wherein each disparity change from one image pair to a next sequential image pair, all preceding the depth jump, is based at least in part on a disparity range for the first image pair; and
    performing a depth detection step to determine where further depth adjustment is required and if such adjustment is required, performing a further change.

2. The method of claim 1, wherein each disparity change from one image pair to a next sequential image pair, all following the depth jump, is based at least in part on a disparity range for the second image pair.

3. The method of claim 2, wherein the changing further includes changing the disparity of the second image pair to a reference disparity amount.

4. The method of claim 3, wherein the reference disparity amount is selected to be indicative of substantially zero separation between the first and second views of the second image pair.

5. The method of claim 1, wherein the disparity change for image pairs preceding the depth jump is equally incremented over a plurality of image pairs.

6. The method of claim 2, wherein the disparity change for image pairs following the depth jump is equally incremented over a plurality of image pairs.

7. The method of claim 1, wherein the detecting includes detecting a change from programming content in the first image pair to advertising content in the second image pair.

8. The method of claim 1, wherein the detecting includes detecting a change from first programming content in the first image pair to second programming content in the second image pair.

9. The method of claim 8, wherein the first programming content includes 2-dimensional content and the second programming content includes 3-dimensional content.

10. The method of claim 8, wherein the first programming content includes 3-dimensional content and the second programming content includes 2-dimensional content.

11. The method of claim 2, further comprising determining the first and second disparity ranges by detecting and establishing correspondences for one or more features in the first and second image pairs, when a depth jump is detected.

12. The method of claim 1, further comprising adjusting a size of some of the disparity adjusted image pairs in accordance with their respective adjusted disparities.

13. The method of claim 1, further comprising rendering each disparity adjusted image pair in the plurality of sequential image pairs for display.

14. The method of claim 1, wherein the detecting further comprises:
    detecting an occurrence of a shot change from the first image pair to the second image pair; and
    performing the detecting of the depth jump, when the shot change is detected for the first and second image pairs.

15. The method of claim 1, wherein detecting an occurrence of a depth jump further comprises:

measuring a difference between the first disparity and the second disparity; and, if the difference is higher than a predetermined threshold, determining that the depth jump is detected for the first and second image pairs.

16. A system for presenting stereoscopic content comprising a plurality of sequential stereoscopic image pairs, each image pair including a first view and a second view, the system comprising:

at least one processor for detecting an occurrence of a channel or scene change, the first and second image pairs being consecutive pairs characterized respectively by a first disparity and a second disparity with the first image pair preceding the second image pair, and for changing respective disparities for at least the first and second image pairs, a third image pair preceding the first image pair, and a fourth image pair after the second image pair for use in presenting the stereoscopic content, wherein, after changing the respective disparities, any two consecutive image pairs appearing between the third and fourth image pairs has a disparity difference that is less than a difference between the first disparity and the second disparity, and wherein the changing is performed incrementally and wherein each disparity change from one image pair to a next sequential image pair, all preceding the depth jump, is based at least in part on a disparity range for the first image pair; and said processor also performing a depth detection step to determine where further depth adjustment is required and if such adjustment is required, performing a further change, a display for displaying at least one stereoscopic image pair output from said at least one processor.

* * * * *